United States Patent [19]

Degen et al.

[11] Patent Number: 5,776,629
[45] Date of Patent: Jul. 7, 1998

[54] RECHARGEABLE BATTERIES AND METHODS OF PREPARING SAME

[75] Inventors: Peter J. Degen, Huntington; Joseph Y. Lee, South Setauket; Ioannis P. Sipsas, Forest Hills; Ralph B. DiPalma, New Hyde Park, all of N.Y.

[73] Assignee: Pall Corporation, East Hills, N.Y.

[21] Appl. No.: 682,388

[22] Filed: Jul. 17, 1996

[51] Int. Cl.$^6$ .................................................. H01M 2/18
[52] U.S. Cl. ........................... 429/131; 29/623.4; 429/94; 429/139
[58] Field of Search ...................... 429/94, 131, 139, 429/153; 29/623.4

[56] References Cited

U.S. PATENT DOCUMENTS

| | | | |
|---|---|---|---|
| 2,988,586 | 6/1961 | André | 429/153 |
| 3,003,012 | 10/1961 | Duddy | 429/153 |
| 3,484,290 | 12/1969 | Knight | 429/153 |
| 4,143,212 | 3/1979 | Ueno et al. | 429/94 X |
| 4,668,320 | 5/1987 | Crabtree | 429/94 X |
| 5,470,676 | 11/1995 | Nakano | 429/139 |
| 5,478,362 | 12/1995 | Oota et al. | 429/94 X |

FOREIGN PATENT DOCUMENTS 0 577 387  1/1994  European Pat. Off.

OTHER PUBLICATIONS

NASA Technical Brief, "Suppressing the Growth of Dendrites in Secondary Li Cells," 20(4), Item #40, NPO–193218 (Apr. 1996).

NASA Technical Brief, "Improved Separators for Rechargeable Lithium Cells," NPO–18585 (1994) (Month Unknown).

Primary Examiner—Stephen Kalafut
Attorney, Agent, or Firm—Leydig, Voit & Mayer, Ltd.

[57] ABSTRACT

The present invention provides a rechargeable battery comprising (a) a container having a top, a bottom, and one or more side walls, and, positioned within the container, (b) an anode subject to shedding during charge/discharge cycling, (c) a cathode subject to shedding during charge/discharge cycling, (d) a separator between the anode and the cathode, (e) an electrolyte, and (f) means to inhibit the formation of a conductive pathway between the anode and the cathode sufficient to render the battery incapable of holding a charge by way of the material shed from the anode and the cathode during charge/discharge cycling. The present invention also provides a method of preparing such a rechargeable battery.

27 Claims, 5 Drawing Sheets

RECHARGEABLE BATTERIES AND METHODS OF PREPARING SAME

TECHNICAL FIELD OF THE INVENTION

The present invention relates to rechargeable batteries and methods of preparing such rechargeable batteries.

BACKGROUND OF THE INVENTION

A wide variety of products, from consumer electronics to battery-powered electric vehicles, utilize electrochemical energy sources. Batteries are devices which are capable of converting electrochemical energy into direct current and include a variety of electrochemical systems, such as AgO/Zn, $Ag_2O$/Zn, HgO/Zn, HgO/Cd, Ni/Zn, Ni/Cd, Ni/MH, Zn/air, Li ion, and other Li-based systems.

A battery typically comprises a pair of electrodes, namely, an anode and a cathode, a battery separator, and an electrolyte. When a load is applied to the battery, electrons are generated through oxidation at the anode. The electrons thus generated pass through the load, then return to the battery at the cathode, where the cathode is reduced.

In such batteries, the electrolytic solution, i.e., the solution containing the electrolyte, is the medium for mass transport between the electrodes. The electrolytic solution typically is aqueous (e.g., 20–40 wt. % KOH or NaOH) for many batteries, although, for Li-based systems, the electrolytic solution more typically is an organic solvent-salt solution (e.g., ethylene carbonate-lithium hexafluorophosphate). The battery separator prevents physical contact between the electrodes and retains the electrolytic solution. In a starved-electrolyte battery, the separator completely occupies the space between the electrodes, and the electrolytic solution is completely contained within the battery separator. The battery separator thus functions as the reservoir for the electrolytic solution in such batteries.

During the charge and discharge cycles of a battery, the physical dimensions of the electrodes can change, e.g., as a result of swelling. Such dimensional changes in the electrodes place significant mechanical stresses on the battery, which can ultimately lead to the formation of a conductive path between the anode and cathode, i.e., a short-circuit which renders the battery incapable of holding a charge.

Thus, there exists a need for a rechargeable battery which inhibits, and preferably avoids, the formation of a short-circuit between the anode and cathode of the battery which would render the battery incapable of holding a charge. The present invention provides such a rechargeable battery, as well as a method of preparing such a rechargeable battery. These and other advantages of the present invention, as well as additional inventive features, will be apparent from the description of the invention provided herein.

BRIEF SUMMARY OF THE INVENTION

The present invention provides a rechargeable battery comprising (a) a container having a top, a bottom, and one or more side walls, and, positioned within the container, (b) an anode subject to shedding during charge/discharge cycling, (c) a cathode subject to shedding during charge/discharge cycling, (d) a separator between the anode and the cathode, (e) an electrolyte, and (f) means to inhibit the formation of a conductive pathway between the anode and the cathode sufficient to render the battery incapable of holding a charge by way of the material shed from the anode and the cathode during charge/discharge cycling. The present invention also provides a method of preparing such a rechargeable battery.

DESCRIPTION OF THE PREFERRED EMBODIMENTS

The present invention is predicated, at least in part, on the discovery that rechargeable batteries become incapable of holding a charge (i.e., of being recharged after discharge) as a result of material shedding from the anode and/or cathode within the battery and forming a conductive pathway (e.g., a short-circuit) between the anode and cathode. The present invention provides a rechargeable battery, and method of preparing such a rechargeable battery, which contain means to inhibit the formation of such a conductive pathway between the anode and the cathode sufficient to render the battery incapable of holding a charge.

In particular, the present invention provides a rechargeable battery comprising (a) a container having a top, a bottom, and one or more side walls, and, positioned within the container, (b) an anode subject to shedding during charge/discharge cycling, (c) a cathode subject to shedding during charge/discharge cycling, (d) a separator between the anode and the cathode, (e) an electrolyte, and (f) means to inhibit the formation of a conductive pathway between the anode and the cathode sufficient to render the battery incapable of holding a charge by way of the material shed from the anode and the cathode during charge/discharge cycling.

In the context of the present invention, the battery can be any suitable rechargeable battery. Typically, the battery will be a nickel metal hydride battery or a lithium ion battery, preferably a nickel metal hydride battery. The anode, the cathode, and the separator can be of any suitable material and configuration. The separator preferably is of a material, such as of a fibrous material, that can be shaped into the various configurations illustrated herein.

Typically, the anode, the cathode, and the separator of the present inventive battery are sheets positioned substantially parallel to the one or more side walls of the container and perpendicular to the top and the bottom of the container. Such sheets can be discontinuous or continuous, such as in a jellyroll configuration battery in which the anode, cathode, and separator are spirally wrapped around each other.

Any suitable means of inhibiting the formation of the conductive pathway between the anode and the cathode can be utilized in the context of the present invention. In particular, the separator is desirably configured so as to inhibit the formation of such a conductive pathway.

Figure 1:
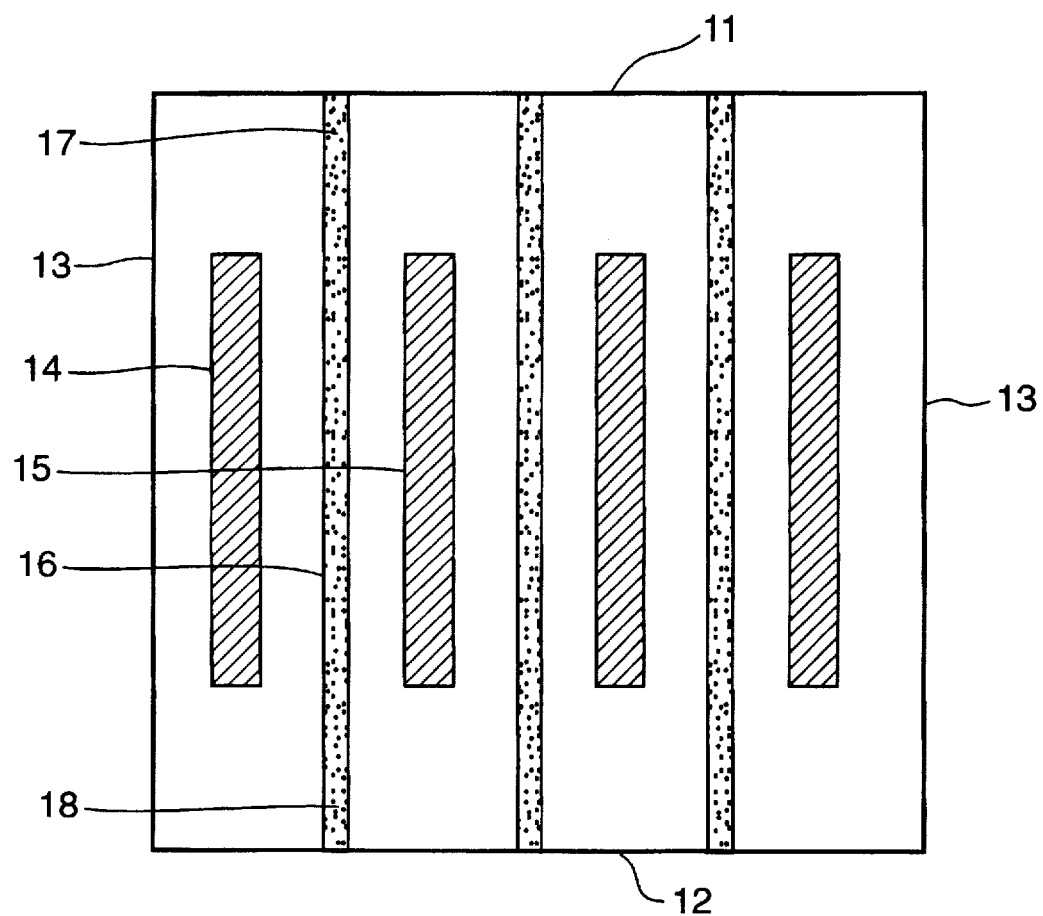
FIG. 1 is a side cutaway view of one embodiment of the present inventive rechargeable battery, wherein the separator extends to the bottom of the container.

In one embodiment of the present invention, the means of inhibiting the formation of the conductive pathway comprises extending the separator to the top, bottom, or both top and bottom of the container so as to effectively partially or wholly seal off the anode from the cathode. Such an embodiment of the present inventive battery is depicted in FIG. 1. The battery of FIG. 1 has a container with a top 11, bottom 12, and sides 13. The anode 14 and cathode 15 are positioned within the container and are separated by a separator 16. The separator 16 extends to the top 11 and bottom 12 of the container at areas 17 and 18, respectively.

Figure 2:
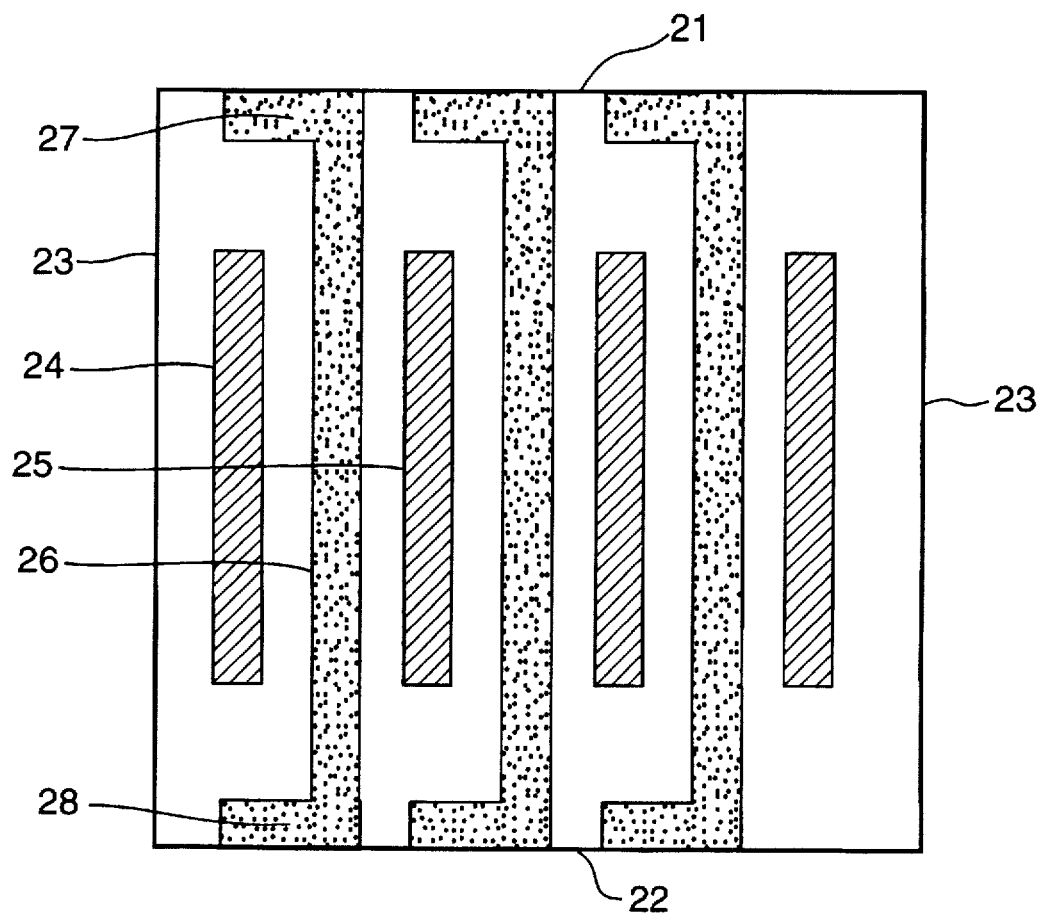
FIG. 2 is a side cutaway view of another embodiment of the present inventive rechargeable battery, wherein the separator extends between one of the electrodes and the bottom of the container.

In another embodiment of the present invention, a portion of the separator is positioned between the anode and/or the cathode and the bottom, top, or both bottom and top of the container. Such an embodiment of the present inventive battery is depicted in FIG. 2. The battery of FIG. 2 has a container with a top 21, bottom 22, and sides 23. The anode 24 and cathode 25 are positioned within the container and are separated by a separator 26. The separator 26 extends to the top 21 and bottom 22 of the container at areas 27 and 28, respectively.

Figure 3:
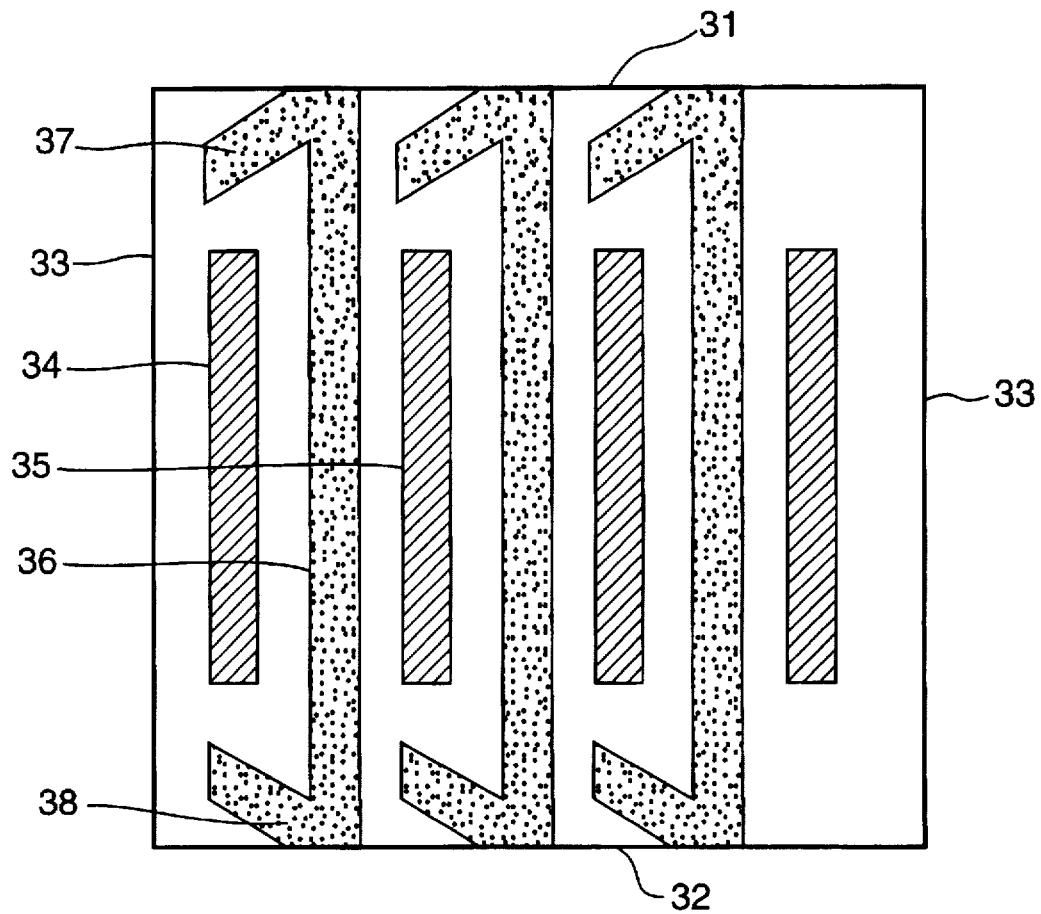
FIG. 3 is a side cutaway view of an alternative embodiment of the present inventive rechargeable battery, wherein the separator extends in a folded configuration between one of the electrodes and the bottom of the container.

In an alternative embodiment of the present invention, the portion of the separator positioned between the anode and/or the cathode and the bottom, top, or both bottom and top of the container is in a folded configuration, i.e., the separator has a folded portion which is positioned between the anode and/or the cathode and the top, bottom, or both top and bottom of the container. Such an embodiment of the present inventive battery is depicted in FIG. 3. The battery of FIG. 3 has a container with a top 31, bottom 32, and sides 33. The anode 34 and cathode 35 are positioned within the container and are separated by a separator 36. The separator 36 has a folded portion 37 which is positioned between the anode 34 and the cathode 35 and the top 31 of the container, as well as a folded portion 38 which is positioned between the anode 34 and the cathode 35 and the bottom 32 of the container. The folded portion of the separator can have any suitable configuration (e.g., angle). The folded portion of the separator is preferably at an acute angle of about 25°–90° relative to the remainder of the separator, more preferably at an acute angle of about 45° relative to the remainder of the separator.

In other embodiments of the present invention, the separator is adjoined (either to itself or by way of another material, e.g., a resin) at the portion of the separator adjacent the top and/or the bottom of the container. Such embodiments of the present inventive battery are depicted in FIGS. 4 and 5.

Figure 4:
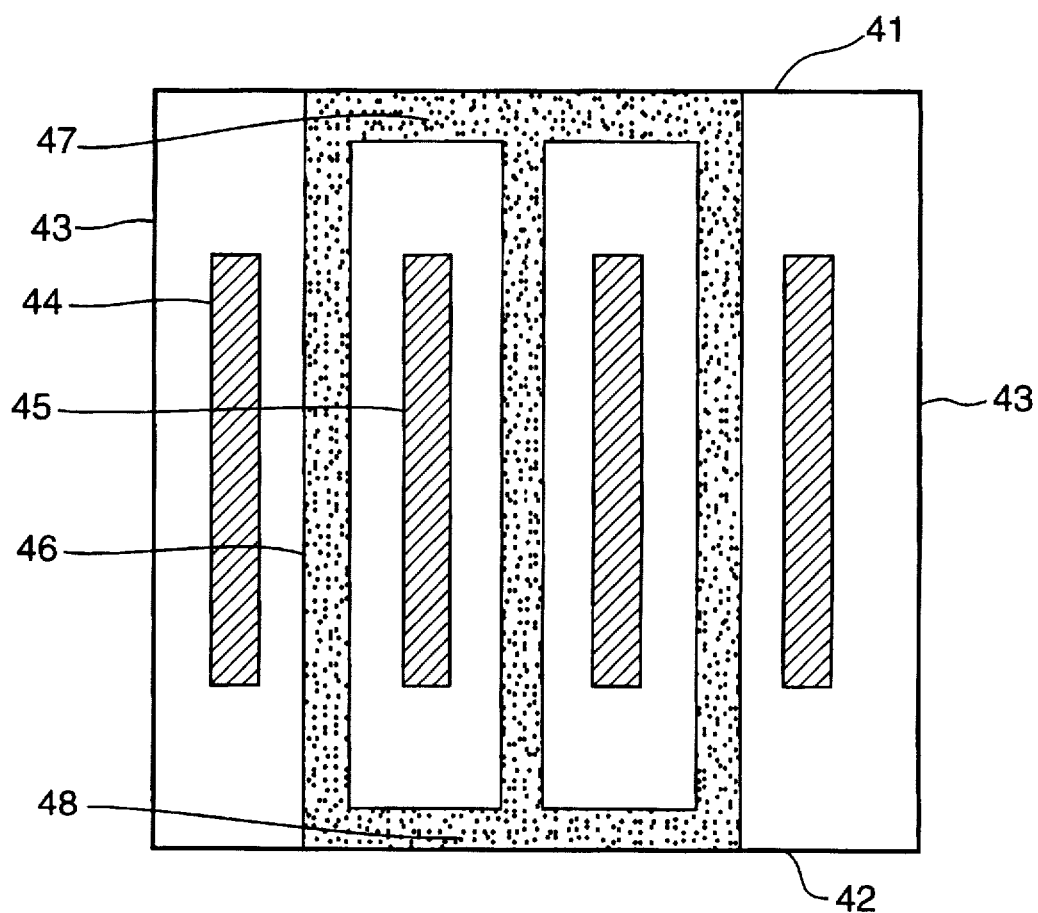
FIG. 4 is a side cutaway view of an additional embodiment of the present inventive rechargeable battery, wherein the separators are adjoined to themselves at one end of the container.

The battery of FIG. 4 has a container with a top 41, bottom 42, and sides 43. The anode 44 and cathode 45 are positioned within the container and are separated by a separator 46. The separator 46 is directly adjoined to itself at region 47 at the top 41 of the container, as well as at region 48 at the bottom 42 of the container.

Figure 5:
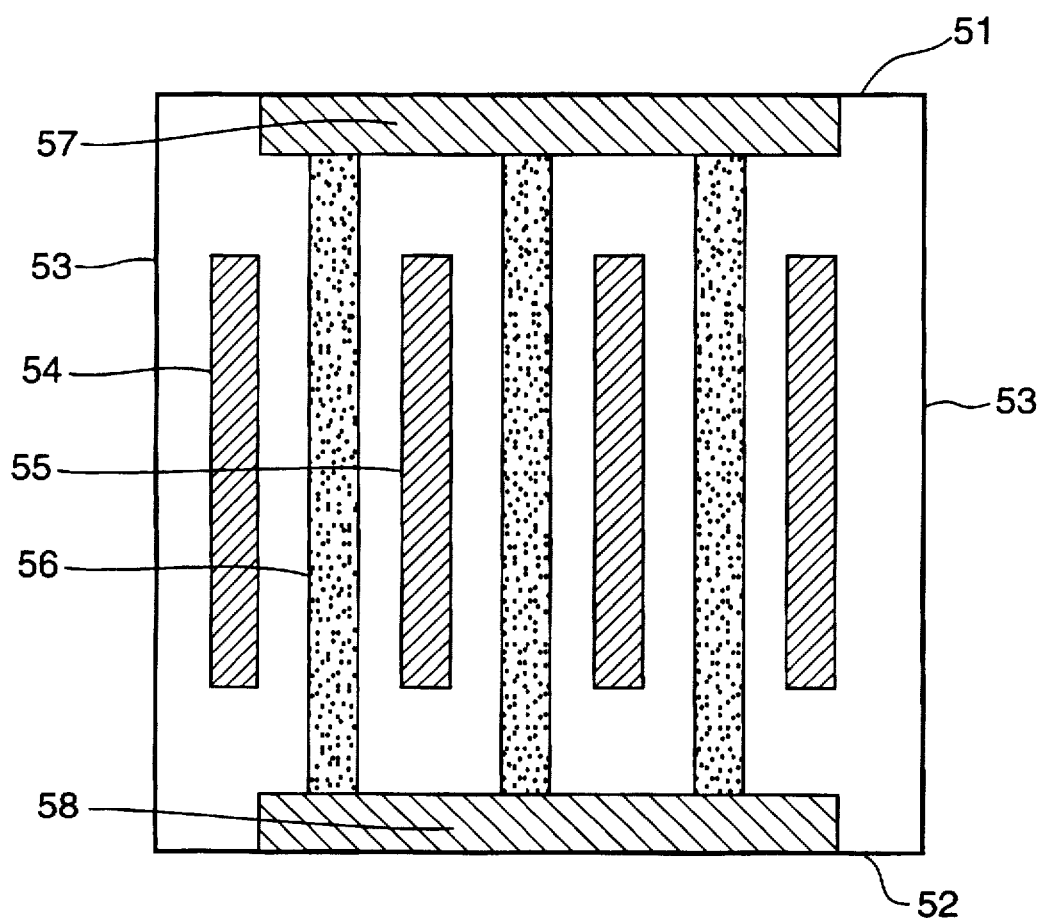
FIG. 5 is a side cutaway view of yet another embodiment of the present inventive rechargeable battery, wherein the separators are adjoined by way of a resin at one end of the container.

The battery of FIG. 5 has a container with a top 51, bottom 52, and sides 53. The anode 54 and cathode 55 are positioned within the container and are separated by a separator 56. The separator 56 is adjoined by another material 57 at the top 51 of the container, as well as by another material 58 at the bottom 52 of the container. The material used to join the separator can be any suitable material, preferably which is compatible with, and can be bound to, the separator. Resins are particularly desirable for such a purpose.

The joinder of the separator is particularly desirable when the present inventive battery is in a jellyroll configuration, i.e., wherein the anode and the cathode are spirally wrapped with the separator therebetween to form a jellyroll of cylindrical configuration having two ends and a midsection positioned parallel to the side walls of the container. In such a configuration, the separator can be adjoined at the portion of the separator at one, or preferably at both, of the jellyroll ends.

The present invention also provides a method of preparing the present inventive battery. In particular, the present invention provides a method of preparing a rechargeable battery comprising (a) a container having a top, a bottom, and one or more side walls, and, positioned within the container, (b) an anode subject to shedding during charge/discharge cycling, (c) a cathode subject to shedding during charge/discharge cycling, (d) a separator between the anode and the cathode, and (e) an electrolyte, wherein the improvement comprises including in the battery means to inhibit the formation of a conductive pathway between the anode and the cathode sufficient to render the battery incapable of holding a charge by way of the material shed from the anode and the cathode during charge/discharge cycling. In the embodiments wherein the anode, the cathode, and the separator are sheets positioned substantially parallel to the one or more side walls of the container and perpendicular to the top and the bottom of the container, the means can comprise (a) having a portion of the separator (which can be folded) positioned between the anode and/or the cathode and the top and/or the bottom of the container or (b) having the separator adjoined at the portion of the separator adjacent the top and/or the bottom of the container, either directly to itself or by way of another material (e.g., a resin).

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A rechargeable battery comprising (a) a container having a top, a bottom, and one or more side walls, and, positioned within said container, (b) an anode subject to shedding during charge/discharge cycling, (c) a cathode subject to shedding during charge/discharge cycling, (d) a separator between said anode and said cathode, and (e) an electrolyte, wherein said anode, said cathode, and said separator are sheets positioned substantially parallel to said one or more side walls of said container and perpendicular to said top and said bottom of said container, and wherein said separator has a folded portion which is positioned between said anode and/or said cathode and said top and/or said bottom of said container so as to inhibit the formation of a conductive pathway between said anode and said cathode, which conductive pathway would render said battery incapable of holding a charge by way of the material shed from said anode and said cathode during charge/discharge cycling.

2. The battery of claim 1, wherein said folded portion of said separator is positioned between said anode and/or said cathode and both said top and said bottom of said container.

3. The battery of claim 1, wherein said folded portion of said separator is at an angle of about 25°–90° relative to the remainder of said separator.

4. The battery of claim 3, wherein said folded portion of said separator is at an angle of about 45° relative to the remainder of said separator.

5. The battery of claim 1, wherein said separator is adjoined to itself or another separator at the portion of said separator adjacent said top and/or said bottom of said container.

6. The battery of claim 5, wherein said separator is directly adjoined to itself.

7. The battery of claim 5, wherein said separator is adjoined to itself or another separator by way of another material.

8. The battery of claim 7, wherein said separator is adjoined to itself or another separator by way of a resin.

9. The battery of claim 5, wherein said separator is adjoined to itself or another separator at the portion of said separator adjacent said top and said bottom of said container.

10. The battery of claim 9, wherein said separator is directly adjoined to itself.

11. The battery of claim 9, wherein said separator is adjoined to itself or another separator by way of another material.

12. The battery of claim 11, wherein said separator is adjoined to itself or another separator by way of a resin.

13. The battery of claim 1, wherein said anode and said cathode are spirally wrapped with said separator therebetween to form a jellyroll of cylindrical configuration having two ends and a midsection positioned parallel to said side walls of said container, and said separator is adjoined to itself at the portion of said separator at one of said jellyroll ends.

14. The battery of claim 13, wherein said separator is directly adjoined to itself.

15. The battery of claim 13, wherein said separator is adjoined to itself by way of another material.

16. The battery of claim 15, wherein said separator is adjoined to itself by way of a resin.

17. The battery of claim 13, wherein said separator is adjoined to itself at both of said jellyroll ends.

18. The battery of claim 17, wherein said separator is directly adjoined to itself.

19. The battery of claim 17, wherein said separator is adjoined to itself by way of another material.

20. The battery of claim 19, wherein said separator is adjoined to itself by way of a resin.

21. A method of preparing a rechargeable battery comprising (a) a container having a top, a bottom, and one or more side walls, and, positioned within said container, (b) an anode subject to shedding during charge/discharge cycling, (c) a cathode subject to shedding during charge/discharge cycling, (d) a separator between said anode and said cathode, and (e) an electrolyte, wherein said anode, said cathode, and said separator are sheets positioned substantially parallel to said one or more side walls of said container and perpendicular to said top and said bottom of said container, wherein the improvement comprises including in said battery said separator having a folded portion which is positioned between said anode and/or said cathode and said top and/or said bottom of said container so as to inhibit the formation of a conductive pathway between said anode and said cathode, which conductive pathway would render said battery incapable of holding a charge by way of the material shed from said anode and said cathode during charge/discharge cycling.

22. The method of claim 21, wherein said folded portion of said separator is positioned between said anode and/or said cathode and both said top and said bottom of said container.

23. The method of claim 21, wherein said separator is adjoined to itself or another separator at the portion of said separator adjacent said top and/or said bottom of said container.

24. The method of claim 21, wherein said anode and said cathode are spirally wrapped with said separator therebetween to form a jellyroll of cylindrical configuration having two ends and a circular midsection positioned parallel to said side walls of said container, and said separator is adjoined to itself at the portion of said separator at one or both of said jellyroll ends.

25. The method of claim 22, wherein said separator is adjoined to itself or another separator at the portion of said separator adjacent both said top and said bottom of said container.

26. The method of claim 23, wherein said separator is adjoined to itself or another separator by way of another material.

27. The method of claim 24, wherein said separator is adjoined to itself by way of another material.

* * * * *